United States Patent
Schworm et al.

(10) Patent No.: US 8,086,099 B2
(45) Date of Patent: Dec. 27, 2011

(54) CAMERA MODULE HAVING A LOW-FRICTION MOVABLE LENS

(75) Inventors: Ernst Schworm, Munich (DE); Gabriel Bartenschlager, Kirchheim (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 12/661,752

(22) Filed: Mar. 23, 2010

(65) Prior Publication Data

US 2011/0142434 A1    Jun. 16, 2011

(30) Foreign Application Priority Data

Dec. 15, 2009  (EP) .................................... 09368049

(51) Int. Cl.
*G03B 13/32* (2006.01)
(52) U.S. Cl. ...................................... 396/144
(58) Field of Classification Search .................... 396/144
See application file for complete search history.

(56) References Cited

U.S. PATENT DOCUMENTS

| | | | |
|---|---|---|---|
| 4,165,918 A * | 8/1979 | Moreno ......................... | 359/820 |
| 4,400,071 A | 8/1983 | Tamura et al. | |
| 4,598,989 A * | 7/1986 | Yamada et al. ................ | 396/103 |
| 4,601,539 A * | 7/1986 | Watanabe ....................... | 359/824 |
| 4,709,311 A * | 11/1987 | Bornhorst ....................... | 362/277 |
| 5,146,071 A * | 9/1992 | Ookubo et al. ............. | 250/201.2 |
| 5,162,948 A * | 11/1992 | Horning et al. ................ | 359/694 |
| 6,035,131 A * | 3/2000 | Washisu .......................... | 396/55 |
| 2008/0037143 A1 | 2/2008 | Yoon | |
| 2008/0144201 A1 | 6/2008 | Koc et al. | |
| 2008/0174889 A1* | 7/2008 | Su et al. ......................... | 359/824 |
| 2008/0186589 A1* | 8/2008 | Jansen et al. ................... | 359/694 |
| 2008/0225415 A1 | 9/2008 | Bogue et al. | |
| 2008/0253003 A1 | 10/2008 | Shin et al. | |
| 2008/0266684 A1 | 10/2008 | Chang | |
| 2010/0053784 A1 | 3/2010 | Kang et al. | |
| 2010/0091391 A1* | 4/2010 | Schwab ......................... | 359/823 |
| 2010/0091392 A1* | 4/2010 | Jung et al. ...................... | 359/824 |

FOREIGN PATENT DOCUMENTS

WO   WO 2008/110189 A1 *   9/2008

OTHER PUBLICATIONS

U.S. Appl. No. 12/658,280, filed Feb. 5, 2010, "Camera Shutter and Position Control Thereof," assigned to the same assignee as the present invention.
European Search Report 10368004.7-2217 Mail date—Feb. 23, 2011, Dilog Imaging Systems GmbH.

* cited by examiner

*Primary Examiner* — W. B. Perkey
(74) *Attorney, Agent, or Firm* — Saile Ackerman LLC; Stephen B. Ackerman (57) ABSTRACT

Systems and methods to achieve an auto-focus camera module having a precise bearing with low friction have been disclosed. Ball bearings are guiding a lens barrel. The balls of the ball bearings are running in guide slots and are held together by ball cages. Creeping of the balls is prevented by a positioning pin being deployed between a fixed part of a carrier of the camera module and a movable part of the lens barrel.

16 Claims, 7 Drawing Sheets

CAMERA MODULE HAVING A LOW-FRICTION MOVABLE LENS

RELATED APPLICATION

This application is related to the following US patent application:
titled "Camera Shutter and position control thereof", Ser. No. 12/658,280, filing date Feb. 5, 2010 and is assigned to the same assignee.

The content of this application is hereby incorporated by reference in their entirety.

BACKGROUND OF THE INVENTION (1) Field of the Invention

This invention relates generally to camera modules and relates more specifically to focusing a digital camera module by a movable lens barrels using ball bearings.

(2) Description of the Prior Art

Digital camera modules are used with many electronic devices such as e.g. mobile phones, personal data assistants (PDAs), computers, etc. These camera modules have to be as small as possible, reliable, and easy to be used, robust and require minimal power consumption. Furthermore the design of the camera modules should allow low manufacturing cost, while the quality of the images has to conform to a high standard.

Therefore modern camera modules should allow auto-focusing and minimal friction of the bearing for a movable lens barrel in order to achieve precise focusing of the camera.

There are known patents dealing with the design of camera modules.

U.S. Patent Publication (US 2008/0037143 to Yoon) teaches a lens assembly has a driving actuator that includes a magnet, a yoke and a coil and is formed along a lens barrel that accommodates a lens unit for focusing and an auto-focus controlling apparatus comprises the lens assembly for camera module. The magnet or the coil has an internal diameter smaller than a maximal diameter of the lens barrel. Therefore, it is possible to manufacture much smaller lens assembly according to the present invention compared to the conventional ones and to reduce the possibility of component damages in the lens assembly in operating the camera module. A magnet, a yoke, and a coil are arranged adjacently to or along the outside of the lens barrel. Besides, leaf springs are formed respectively on the top of the lens barrel and the beneath the lens barrel. The leaf springs interconnect the lens barrel, which moves repeatedly up and down, with the magnet, yoke, and coil fixed to the lens barrel so that they function as supplying currents with both ends of the coil. The lens barrel and a driving actuator including the magnet, the yoke, and the coil for operating the lens barrel are accommodated in a housing through threaded couplings.

U.S. Patent Publication (US 2008/0225415 to Bogue et al.) discloses a camera module including an integral motor for rotating a lens unit of the camera module within a housing of the camera module. The housing includes a plurality of electromagnetic coils that function as a stator of the motor. The lens unit includes a plurality of ferrite elements and functions as a rotor of the motor. Rotation of the lens unit within the housing causes focal adjustment, such that the motor can be used as a component of an auto-focus system. A method for assembling the camera module is also disclosed. The individual coils are disposed adjacent the periphery of the lens barrel so that the plurality of electromagnetic coils surrounds the lens barrel of the lens unit. Control circuitry selectively energizes the electromagnetic coils to control the rotational movement of the rotor with respect to the stator.

U.S. patent (U.S. Pat. No. 4,400,071 to Tamura et al.) describes a mark finder for an auto-focus camera provided with a photographic field mark indicating a picture frame within the field of view of the finder, and a distance measuring area mark indicating the light metering field of a photoelectric in-focus detecting device, the above-described photographic field mark and the above-described distance measuring area mark are formed to be adjustable independently of each other. A spring is provided between the housing and a lock washer provided on the guide shaft at a suitable location, urging the lens barrel to move in the direction desired.

SUMMARY OF THE INVENTION

A principal object of the present invention is to achieve methods and systems for a camera module having a movable lens barrel that can be moved with minimal friction.

A further object of the present invention is to achieve a camera module requiring low manufacturing cost.

A further object of the present invention is to achieve a camera module having a movable lens barrel wherein ball bearings are guiding a lens barrel.

Another further object of the present invention is to achieve a camera module having a movable lens barrel wherein ball bearings are guiding the lens barrel.

A further object of the present invention is to achieve a camera module having a movable lens barrel wherein ball bearings are guiding the lens barrel and any creeping of the balls is not possible.

In accordance with the objects of this invention a method for a precise bearing with low friction of a movable lens barrel of a camera module has been achieved. The method invented comprises the following steps: (1) providing a camera module comprising a lens barrel holding one or more lenses, one or more actuators to move the lens barrel, and a carrier, (2) deploying ball bearings to guide movements of the lens barrel, and (3) using ball cages to hold the balls of the ball bearings.

In accordance with the objects of this invention an auto-focus camera module having a precise bearing and low friction has been achieved. The camera module invented comprises, firstly: an image sensor, a shutter with an aperture function driven by a linear motor, and said motor driving the shutter, wherein the motor has an integrated position sensing system. Furthermore the camera module comprises a lens barrel; a carrier, one or more actuators to move the lens barrel, and ball bearings between the lens barrel and the carrier to guide the movements of the lens barrel.

In accordance with the objects of this invention an auto-focus camera module having a precise bearing and low friction has been achieved. The camera module invented comprises: a lens barrel, a carrier, one or more actuators to move the lens barrel, and ball bearings between the lens barrel and the carrier to guide the movements of the lens barrel.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems for auto-focus camera modules wherein ball bearings are guiding a movable lens barrel, the balls of the ball bearings are running in ball cages and an anti-creeping system is introduced in order to keep balls and cages in place in case of any shocks. In order to meet high image quality targets a very precise bearing with low friction is required.

It should be understood that the present invention could be used for zooming applications as well.

A key advantage of the present invention is that the camera mole can be moved with minimal friction, which is a prerequisite for meeting high quality image targets, and can be manufactured with lower costs than prior art using threads or guiding rods.

Figure 1:
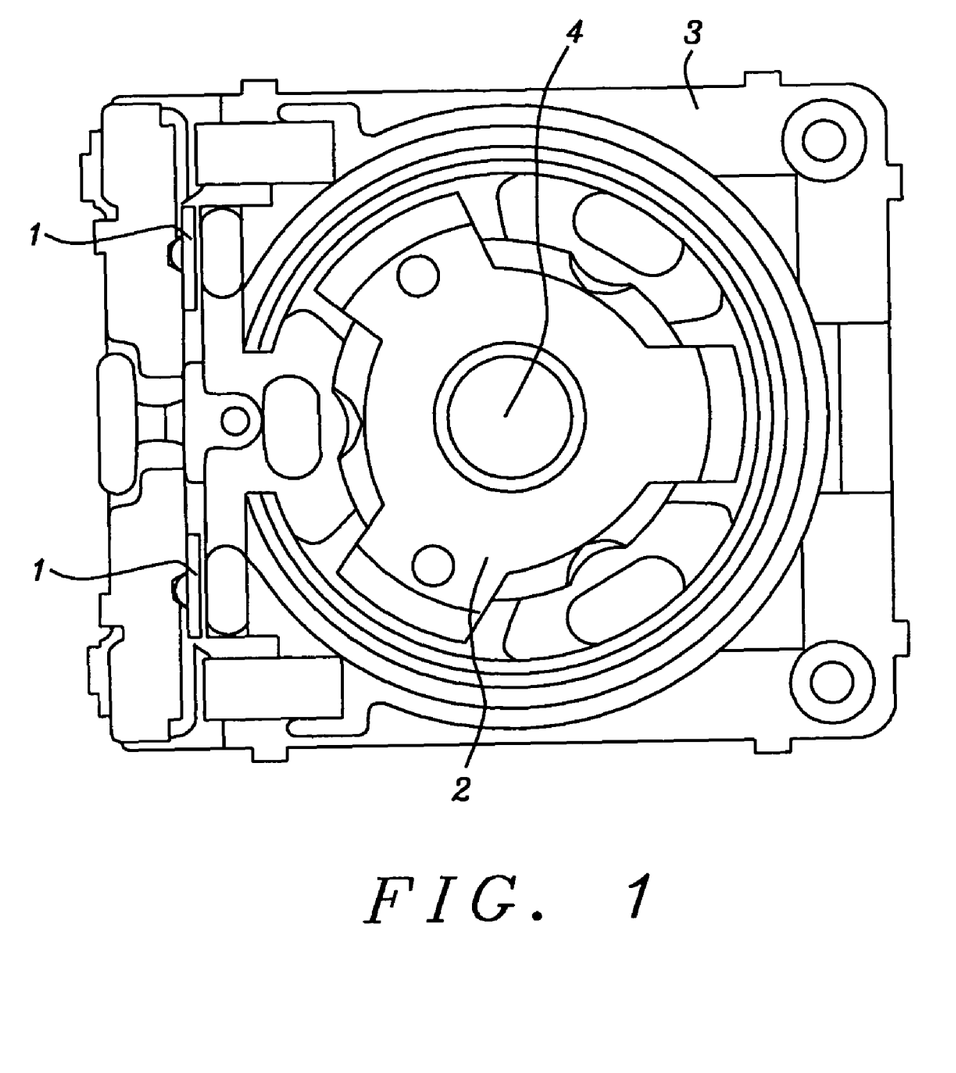
FIG. 1 illustrates an overall block diagram showing switches for generating the symmetrical output voltages CSP (positive) and CSN (negative).

FIG. 1 shows a top view of an embodiment a camera module of the present invention. It shows a movable lens barrel 2 containing one or more lenses 4, ball bearings 1 to achieve minimal friction of the movement of the lens barrel and a carrier 3. The lens barrel 2 is moving up and down with respect to the carrier 3. The ball bearing system 1 is guiding the lens barrel 2 containing the lens 4.

Figure 2:
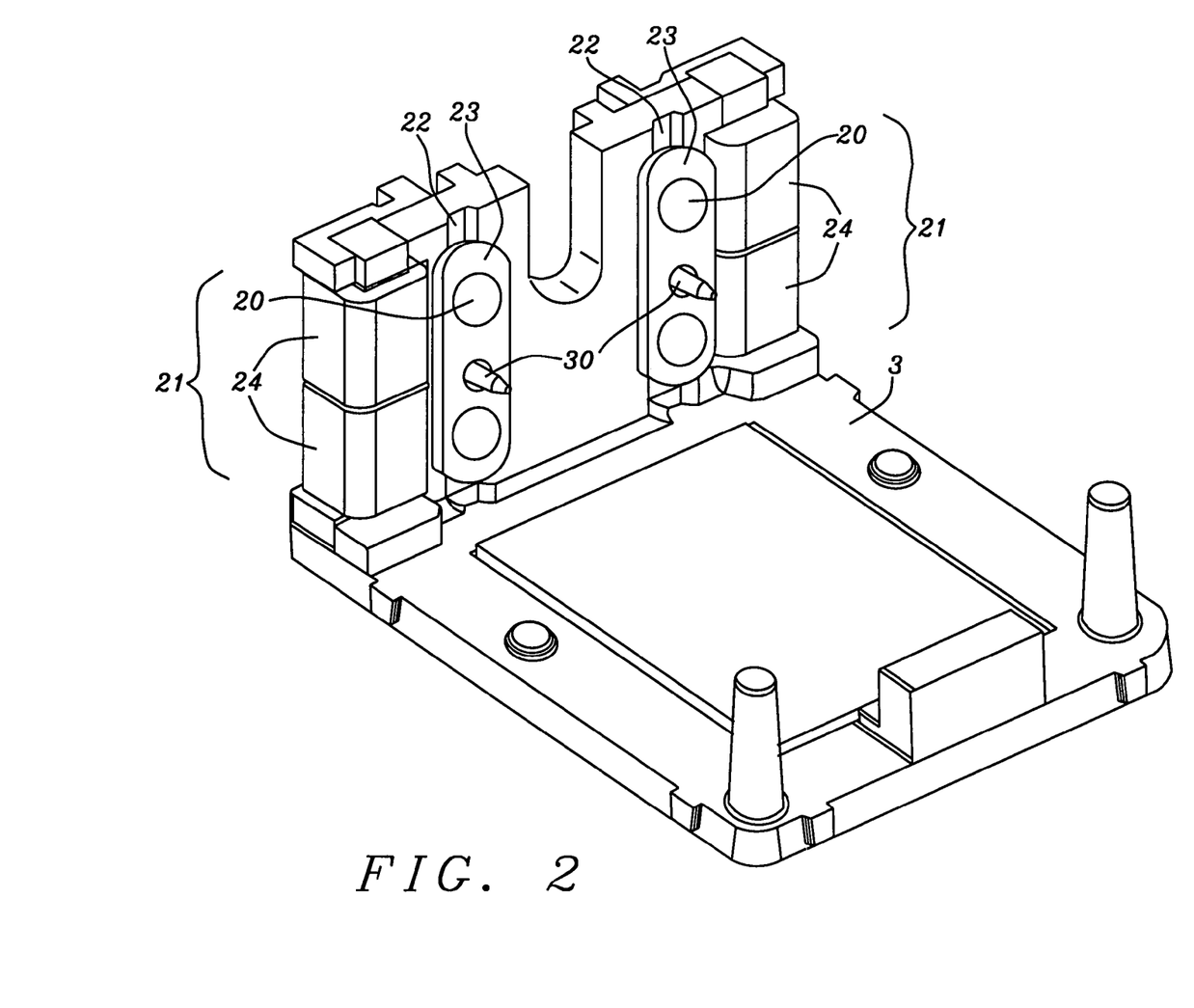
FIG. 2 is a table illustrating the switching sequence for the +/−Vdd/5 mode.

FIG. 2 illustrates basic components of a preferred embodiment of the ball bearing system for a camera module invented. It shows two guide slots 22 of the ball bearing being located on the inner side of the carrier 3. Preferably the two guide slots 22 are located on a same side of the carrier 3 as shown in FIG. 2. It should be noted that more than two guide slots 22 could be used as well and the guide slots 22 could be deployed on different inner sides of the carrier 3 i.e. they could be deployed on adjacent or neighboring sides. In a preferred embodiment of the invention two balls 20 are used in each of the two guide slots 22. It would be also possible to use more than two balls 20 in each guide slot 22. A positioning pin 30, which will be explained below in more detail, is used in each guide slot 22 to avoid any creeping effect of the ball bearings.

In a preferred embodiment a positioning pin is deployed in each guide slot in order to prevent undesired movements of balls in guide slots that are not protected by a pin.

Furthermore in each guide slot a ball cage 23 is holding the balls 20 of the correspondent guide slot 22 together. A ball cage 23 holds the balls 20 of each guide slot 22 together.

Bidirectional actuators 21, comprising coils 24 wrapped around magnetic metal, preferably iron, and at least one permanent magnet are deployed to move the lens barrel.

In a preferred embodiment two of such actuators are used to move the lens barrel and the permanent magnet is mounted on the lens barrel and the iron carrying the coils is mounted on the carrier.

Opposite to roller bearings, where an infinite movement of the balls and cage is possible and desirable, in linear guided systems an infinite movement of the ball cage in any direction is a problem and unavoidable, if no special precautionary measures are taken. If a ball cage (and thus ball) movement occurs for example due to shock reasons the guided system has to overcome friction of the balls first and only then rolling is possible again. Therefore larger forces are necessary at the beginning of the movement.

Figure 3:
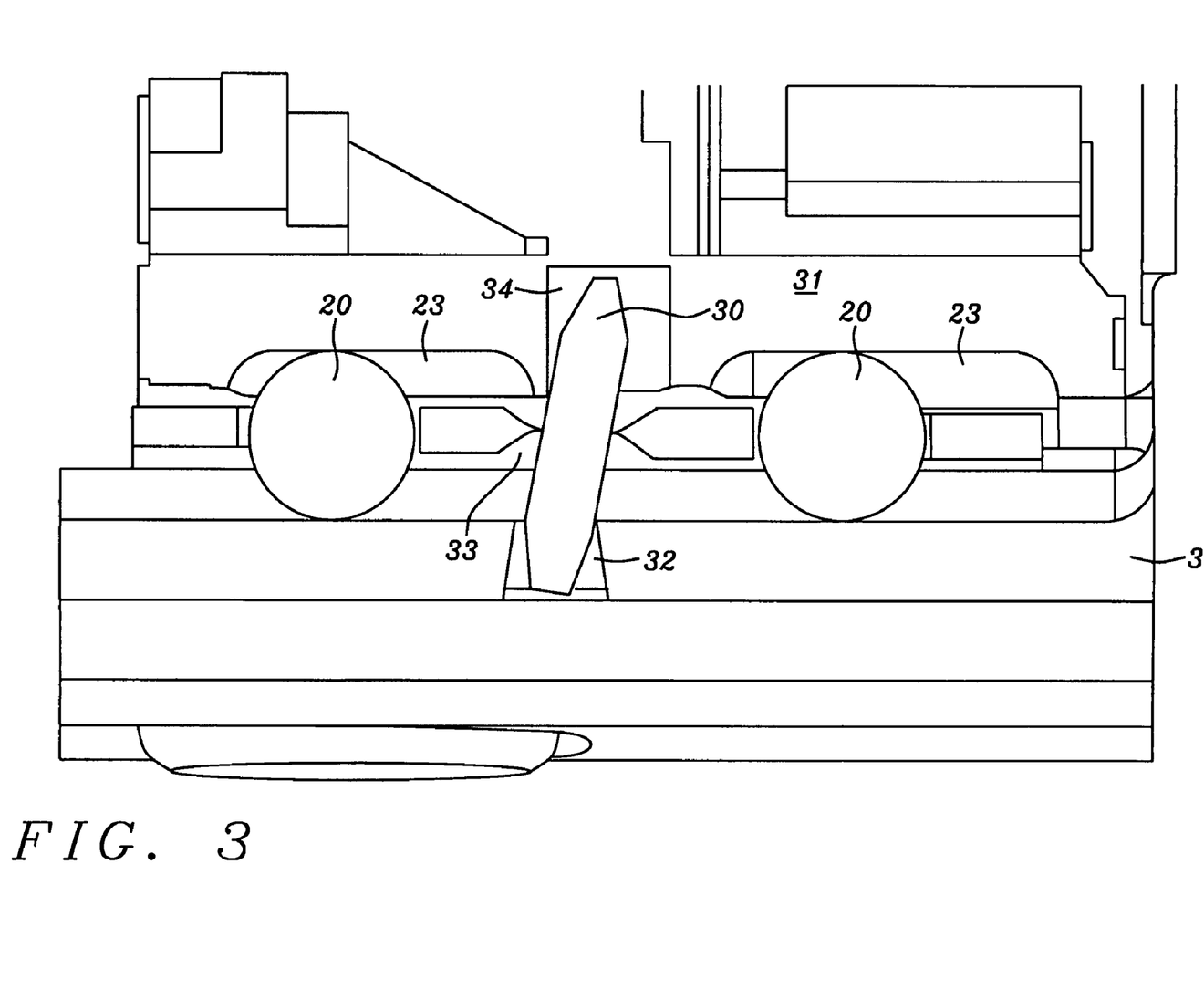
FIG. 3 is a table illustrating the switching sequence for the +/−Vdd/6 mode.

FIG. 3 shows a mechanism invented to avoid creeping of the balls of the ball bearings. FIG. 3 shows a fixed part 3, i.e. a part of the carrier 3 of the camera module, two of the balls 20, a moving part 31, which is firmly connected to the lens barrel, a ball cage 23, and the positioning pin 30.

In a preferred embodiment there is no axis provided for the positioning pin 30 in a strong sense. The pin 30 has the freedom to turn round the hole 33 in the ball cage and is restricted through the hole 34 in the moving part and the hole 32 in the fixed part as well. The rotation is driven by the moving part. Alternatively a turning axis for the positioning pin 30 could be provided.

The friction of the balls 20 is minimized if the balls 20 and the ball cage 22 run with half the speed, or correspondently with half the stroke, of the moving part 31.

Figure 4A:
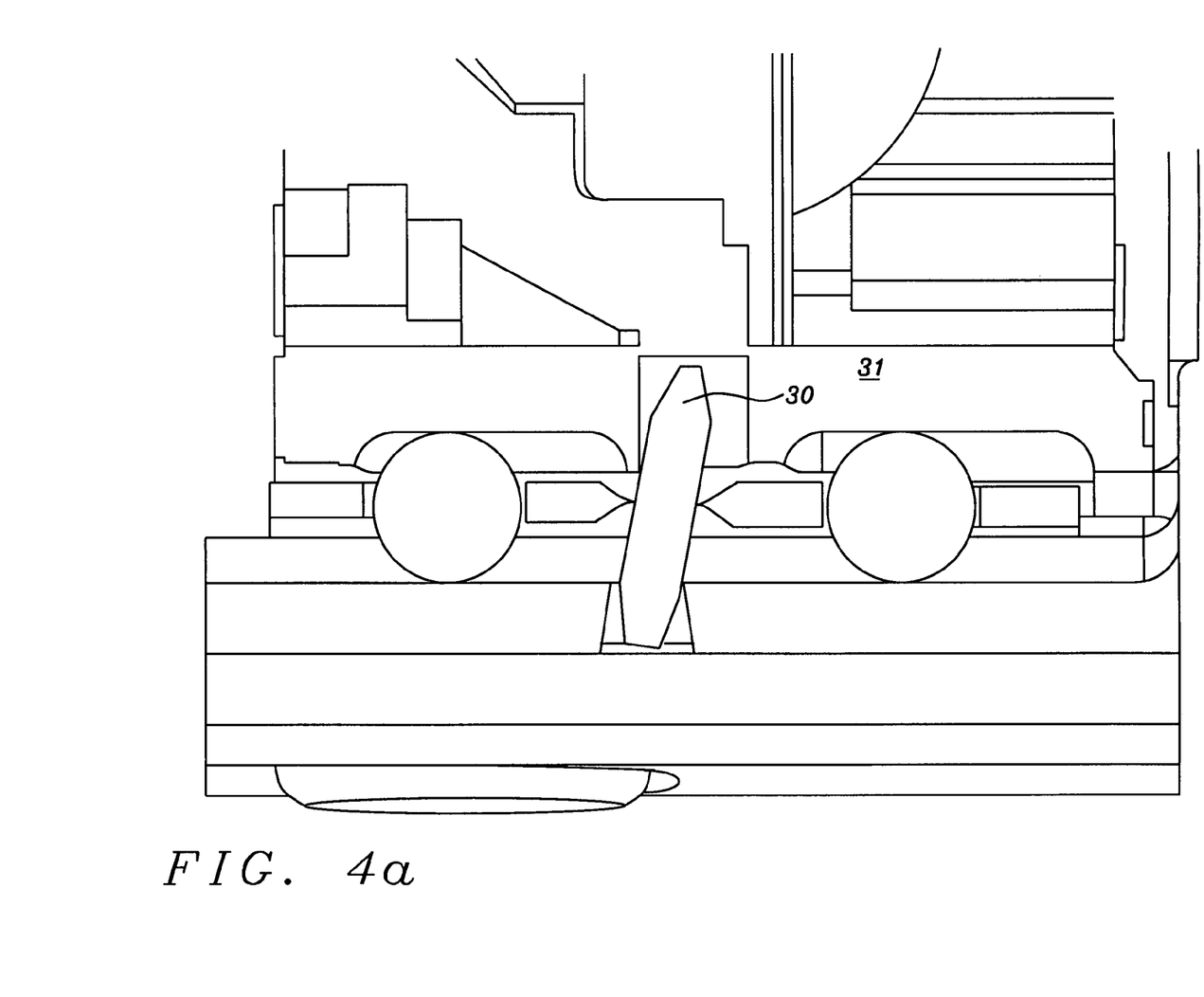
FIG. 4 illustrates a flowchart of a method invented of generating energy efficient supply voltages being symmetrical around ground voltage.
Figure 4B:
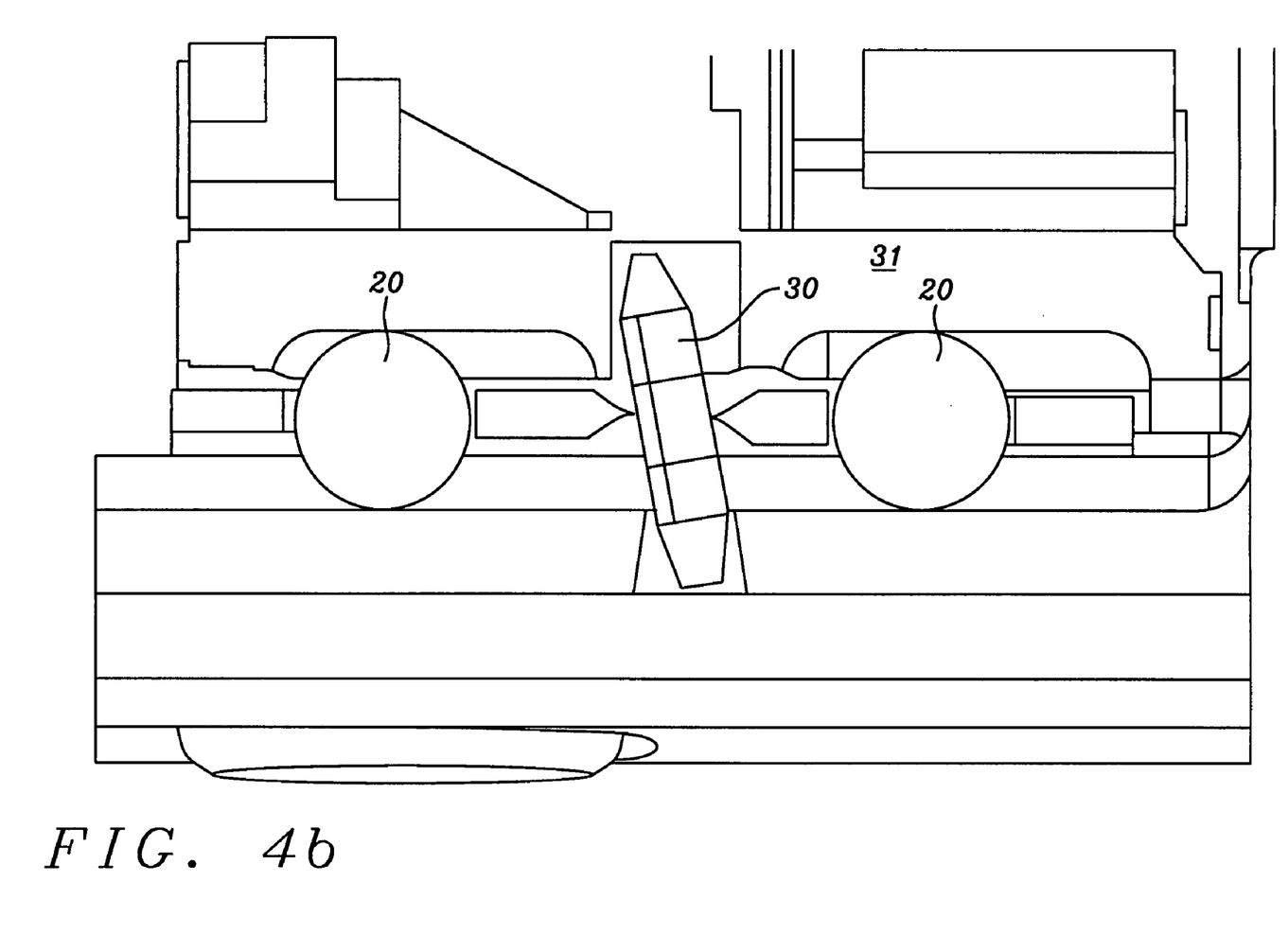

FIGS. 4a-b show in detail how the positioning pin 30 works. FIG. 4a-b show the moving part 31 in the two extreme lens positions. FIG. 4a shows the moving part 31 in the utmost right position and FIG. 4b shows the moving part 31 in the utmost left position. The positioning pin 30 blocks creeping of the ball cage 22 and of the moving part 31 beyond the right or left end positions.

it is obvious that the anti-creeping effect of the positioning pin 30 works only for small strokes as it is the case with focusing of small camera modules, wherein strokes in the order of magnitude of very few millimeters or even only fractions of millimeters are required. The desired effect of keeping balls and balls cage in place can be fully achieved. Any initial friction is prevented by using the positioning pin of the present invention.

Figure 5:
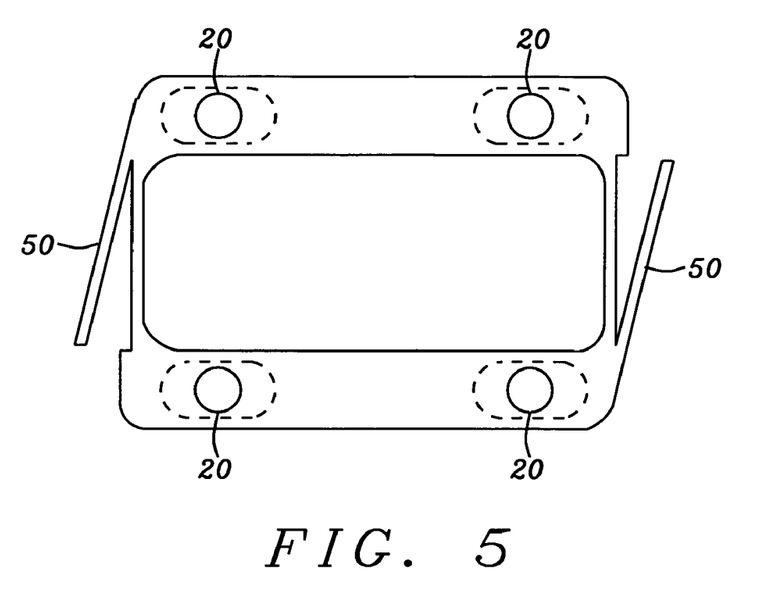
FIG. 5 illustrates a replacement of a single switch by e.g. 5 smaller switches in parallel.

FIG. 5 shows an alternative implementation of the present invention. Instead of using a positioning pin as shown in FIGS. 3 and 4 springs 50 are used to overcome friction when an extrememe position of the lens barrel is reached.

Moreover instead of using ball bearings to guide the lens barrel materials having a very low friction can be used. Examples for such materials are ceramic or teflon having a static friction coefficient $\mu_s$ in the order of magnitude of 0.04, wherein ist kinetic friction coefficient is even lower.

The camera module invented furthermore comprises an integrated circuit (IC) controlling the actuators of the present invention, an image sensor, and a shutter which also can be used as an aperture. This IC also controls one or more motors with integrated position control to move shutter blades of the camera module as disclosed in the patent application titled "Camera Shutter and position control thereof", Ser. No. 12/658,280, filing date Feb. 5, 2010.

Figure 7:
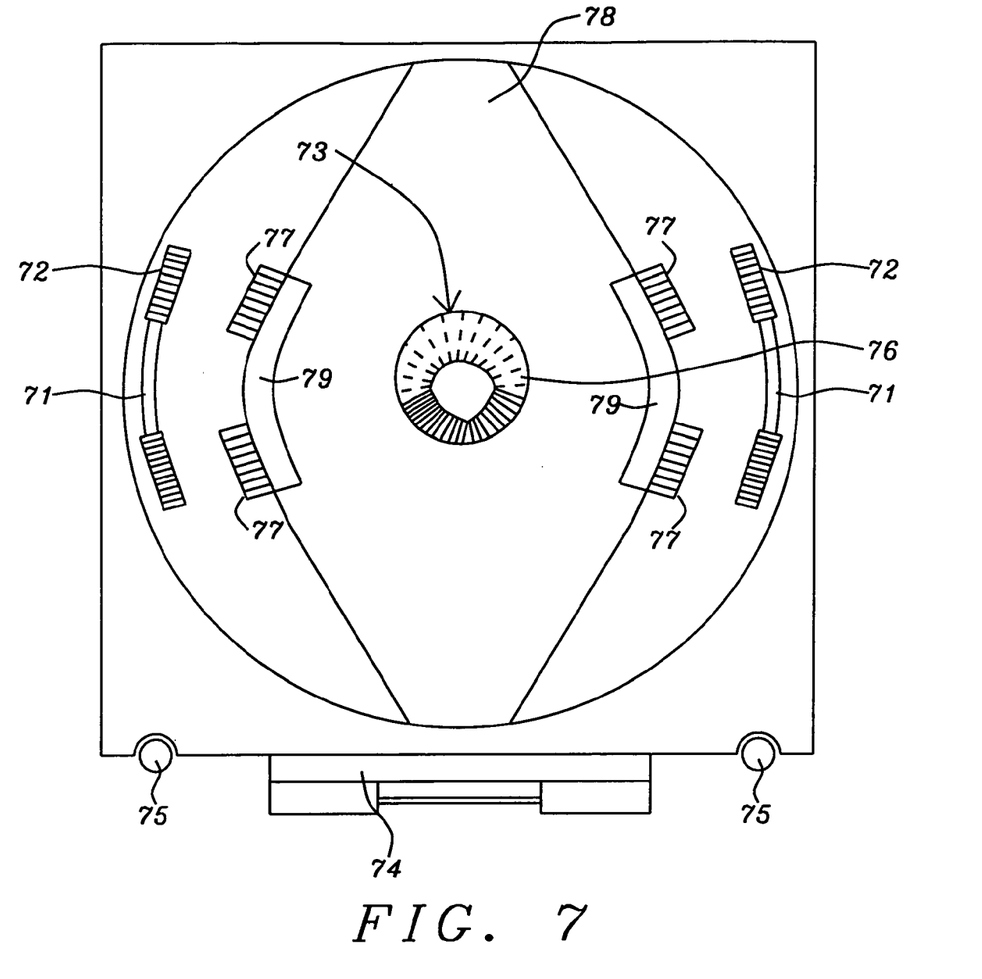
FIG. 7 shows a preferred embodiment of the shutter of the camera system.

FIG. 7 shows a preferred embodiment of the shutter of the camera system as disclosed in US patent application titled "Camera Shutter and position control thereof", Ser. No. 12/658,280, filing date Feb. 5, 2010. The shutter is mounted on top of a lens barrel (not visible) or on top of the moving part of the lens system.

The coils 72 of two bidirectional linear motors driving shutter blades 76 are wrapped around iron coil cores 71. The coils 72 and iron coil cores 71 are mounted on the case of the shutter and inside of a lens barrel of a zoom lens system. Furthermore each linear motor driving shutter blades comprises two magnets 77 fastened on a movable yoke 78, which is mechanically connected to the shutter blades 76. The magnets are moved by magnetic force depending upon the currents through the coils 72 and the linear motors are moving the shutter blades 76 via the yoke 78. The opening 73 of the yoke 78 defines a maximal aperture opening.

Figure 8:
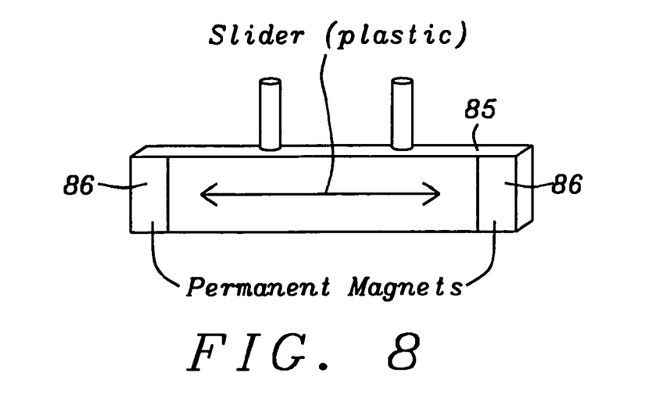
FIG. 8 shows a shutter/aperture actuator comprising in a preferred embodiment of the invention a plastic body and two permanent magnets at both ends of the body.

FIG. 8 shows a shutter/aperture actuator comprising in a preferred embodiment of the invention a plastic body 85 and two permanent magnets 86 at both ends of the body 85 as disclosed in US patent application titled "Camera Shutter and position control thereof", Ser. No. 12/658,280, filing date Feb. 5, 2010. In an alternative embodiment of the invention the permanent magnets 86 are replaced by pieces of magnetic metal as e.g. iron. In this case a single motor can move the actuator in one direction only. Therefore, in case of using magnetic metal instead of permanent magnets, two motors are required to move the actuator forward and backward, each motor can move in one direction only.

Figure 6:
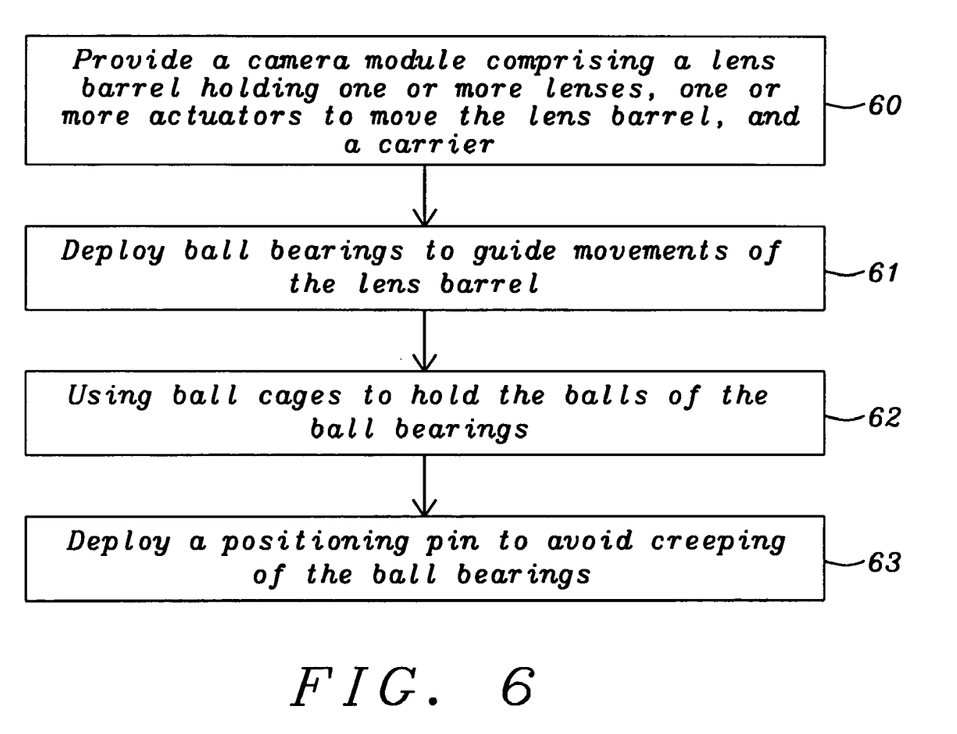
FIG. 6 illustrates an integrated charge pump providing the necessary gate-source voltage for a transistor switch.

FIG. 6 illustrates a flowchart of a method invented to move a lens barrel of an auto-focus camera module. A first step 60 describes the provision of a camera module comprising a lens barrel holding one or more lenses, one or more actuators to move the lens barrel, and a carrier. The next step 61 illustrates deploying ball bearings to guide movements of the lens barrel. As outlined above ball bearings provide minimal friction and are substantial to meet high image quality targets. The following step 62 describes using ball cages to hold the balls of the ball bearings. Step 63 describes deploying a positioning pin to avoid creeping of the ball bearings.

While the invention has been particularly shown and described with reference to the preferred embodiments thereof, it will be understood by those skilled in the art that various changes in form and details may be made without departing from the spirit and scope of the invention.

What is claimed is:

1. A method to achieve a precise bearing with low friction of a movable lens barrel of a camera module comprising the following steps:
   (1) providing a camera module comprising a lens barrel holding one or more lenses, one or more actuators to move the lens barrel, and a carrier;
   (2) deploying ball bearings to guide movements of the lens barrel;
   (3) using ball cages to hold the balls of the ball bearings, and
   (4) deploying a positioning pin between the carrier and the lens barrel to avoid creeping of the ball bearings.

2. The method of claim 1 further comprising stopping said ball cages if an end position of the ball barrel is reached by said positioning pin.

3. The method of claim 1 further comprising guiding the movements of the lens barrel by two ball bearings.

4. The method of claim 1 further comprising providing each actuator with coils wrapped around magnetic metal and a permanent magnet.

5. The method of claim 4 further comprising mounting the permanent magnet on the lens barrel and mounting the magnetic metal carrying the coils on the carrier.

6. The method of claim 1 further comprising deploying springs on both ends of the ball bearings in the directions of movements avoid creeping of the ball bearings.

7. The method of claim 1 further comprising providing an auto-focus camera module for said camera module.

8. The method of claim 1 further comprising moving said lens barrel for zooming.

9. An auto-focus camera module having a precise bearing and low friction, comprises:
   a shutter with an aperture function driven by a linear motor;
   said motor driving the shutter, wherein the motor has an integrated position sensing system;
   a lens barrel;
   a carrier;
   one or more actuators to move the lens barrel; and
   ball bearings between the lens barrel and the carrier to guide the movements of the lens barrel, wherein a positioning pin is deployed between the carrier and the lens barrel to avoid creeping of the ball bearings.

10. An auto-focus camera module having a precise bearing and low friction, comprises:
    a lens barrel;
    a carrier;
    one or more actuators to move the lens barrel; and
    ball bearings between the lens barrel and the carrier to guide the movements of the lens barrel wherein a positioning pin is deployed between the carrier and the lens barrel to avoid creeping of the ball bearings.

11. The camera module of claim 10 wherein two ball bearings are used to guide the movements of the lens barrel.

12. The camera module of claim 11 wherein both ball bearings are deployed on a same inner side of the carrier.

13. The camera module of claim 10 wherein each ball bearing carries two balls.

14. The camera module of claim 10 wherein each ball bearing has a ball cage.

15. The camera module of claim 10 wherein the balls of the ball bearings run in guide slots.

16. The camera module of claim 10 wherein said lens barrel is moved for zooming.

* * * * *